April 6, 1937.　　G. S. VON HEYDEKAMPF　　2,075,968
HYDRAULIC LOAD PRODUCING MEANS
Filed April 15, 1933　　3 Sheets-Sheet 2

INVENTOR
G.S. von Heydekampf
BY
ATTORNEY

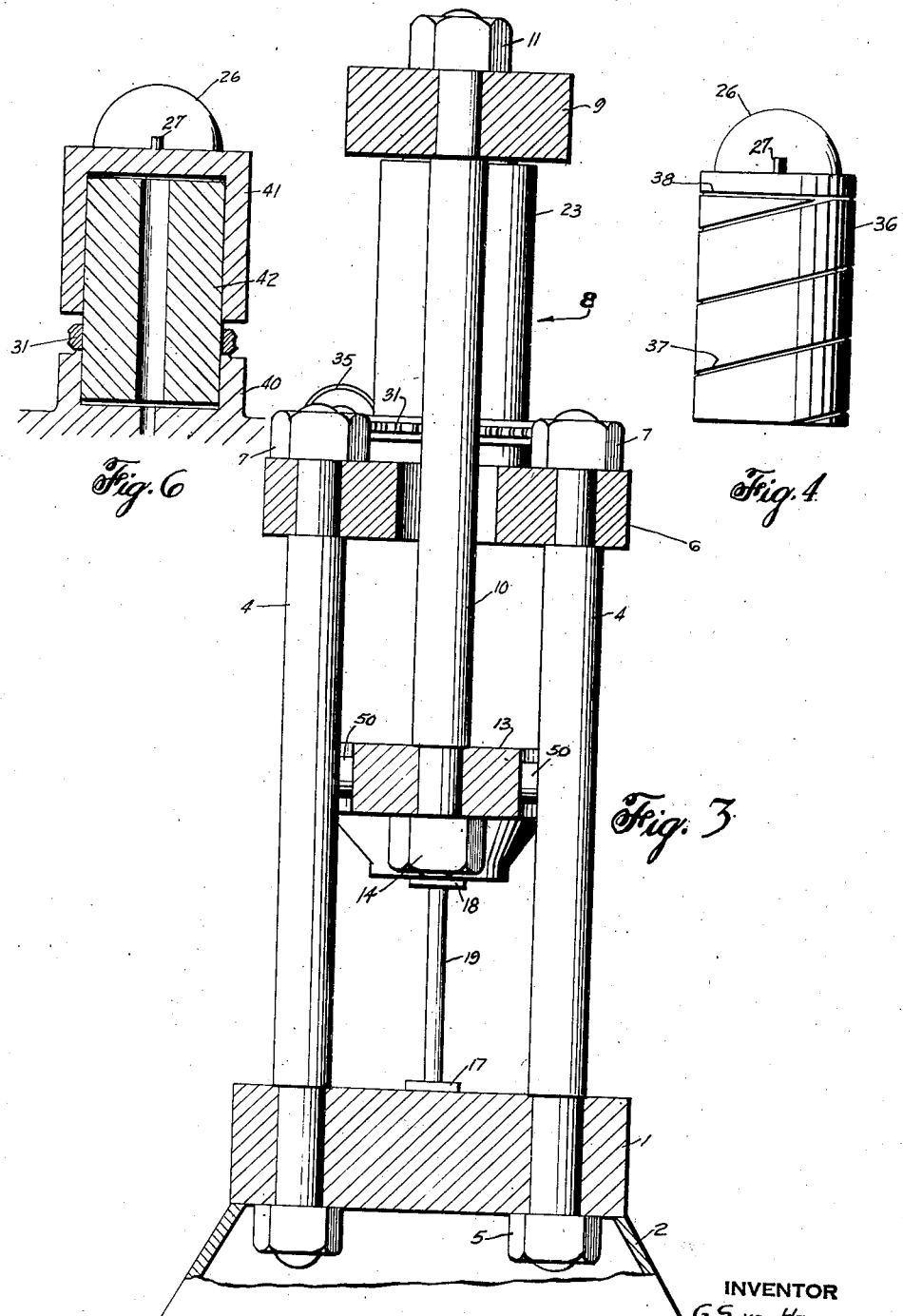

Patented Apr. 6, 1937

2,075,968

UNITED STATES PATENT OFFICE 2,075,968

HYDRAULIC LOAD PRODUCING MEANS

Gerd S. von Heydekampf, Chester, Pa., assignor to Baldwin-Southwark Corporation, a corporation of Delaware Application April 15, 1933, Serial No. 666,315

4 Claims. (Cl. 265—14)

This invention relates generally to improved means for weighing mechanical forces by medium of hydraulic pressure such as might be used in materials testing machines, pressure gauges, gauge testers, control valves, etc., the invention being herein shown as applied particularly to a ram type of materials testing machine having an improved combination for rendering such a type of machine highly accurate for scientific study and investigations of the strength of materials especially as to their stress-strain characteristics in tension or compression.

Hydraulic testing machines have many advantages over the mechanical types which employ a system of levers and counterpoise but of the hydraulic machines only the diaphragm type has heretofore proven to have a high degree of accuracy. Other types of hydraulic testing machines such as those employing a ram have heretofore been found to be of limited application, although the ram type of hydraulic testing machine has the advantage of offering from a structural standpoint, the best opportunity for low cost of manufacture but has the inherent objection of excessive ram and cylinder friction which injects a very material error in a test. This error becomes proportionately greater as the capacity of the machine becomes smaller, thus rendering such a type of machine in its usual forms less accurate than the invention herein shown, although under certain circumstances and types of tests this old type may be suitable.

It is one object of my invention to provide an improved ram type of hydraulic testing machine which will be highly accurate, economical in construction and operation and will have the advantages of flexible operation and dependability of the more expensive diaphragm type of hydraulic machines.

A further object is to provide an improved combination for reducing the ram and cylinder friction without introducing other disturbing and error producing conditions. In one aspect of the invention I accomplish this by an improved arrangement for maintaining the hydraulic load producing elements in proper operative relation and alignment so that the full benefits of the controlled or reduced friction may be reflected in increased accuracy of the machine.

A further object is to provide improved means for continuously rotating the cylinder of the load producing ram, preferably at a uniform rate, either during compression or tension tests, and to have the cylinder and ram and their supporting relation to the machine, together with the cylinder rotating means, so arranged that the machine may have maximum flexibility and accuracy in operation with no interference or complications during insertion or removal of a specimen.

Other objects and advantages will be more apparent to those skilled in the art from the following description of the accompanying drawings in which:

Fig. 3 is a vertical section taken on the line 3—3 of Fig. 2;

Fig. 4 is a modified form of ram;

Fig. 6 is a modified arrangement of rams and rotating element;

Fig. 7 is a modified means for holding the movable ram against rotation.

Figure 2:
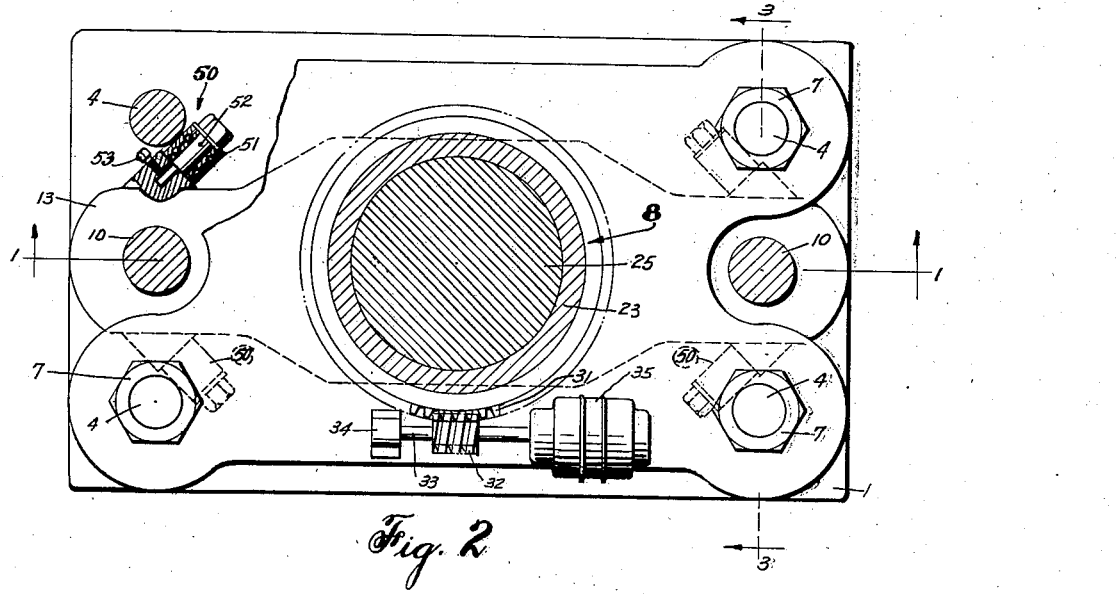
Fig. 2 is a horizontal section taken on the line 2—2 of Fig. 1.

In the specific embodiments of the invention which are shown herein merely for the purposes of illustrating the principle of the invention and a few forms among others that the invention might take, I have provided a lower stationary platen 1 supported in any suitable manner, for example, by inclined plate steel sides 2 welded or otherwise suitably secured to the platen 1 and to a base 3. Vertical columns or rods 4, preferably four in number, are secured at the four corners of platen 1 as by nuts 5. The upper ends of these rods extend through and are secured to an upper stationary platen 6 as by nuts 7. My improved hydraulic load producing device generally indicated at 8 is interposed between said upper stationary platen 6 and a cross-head generally indicated at 9 which is supported upon two rods 10 secured thereto as by nuts 11. Rods 10 extend vertically through suitable openings which may be in the form of holes although it is herein shown as recesses 12 formed in the upper stationary platen 6 and pass through and are secured to a movable platen 13 as by nuts 14. From Figs. 2 and 3 it is seen that rods 10 are disposed preferably midway between each pair of rods 4 and in alignment therewith in a transverse direction. All of the rods are provided with suitable shoulders to oppose the holding nuts.

The lower stationary platen and intermediate movable platen 13 are each provided with tapered recesses 15 and 16 to receive respectively adjustable and removably held jaws 17 and 18 for any usual form of specimen generally indicated at 19. These jaws may of course be controlled or manipulated by any suitable operating mechanism, not shown. As is usual the taper of the jaws and their openings are in opposite directions to insure maximum holding of the specimen when subjected to tension although it will of course be understood that any desired form of jaw may be employed depending upon the particular conditions of operation and form of specimen being tested. A bracket 17' prevents jaws 17 from falling completely out of their recess. A recess 20 is formed in the upper side of platen 13 to receive a compression block 21 to be placed therein upon removal of jaws 18, a specimen being tested in compression between block 21 and platen 6.

The preferred form of hydraulic load producing mechanism 8 comprises a cylinder or sleeve 23 having a cylindrical bore whose lower open end is journalled upon a stationary ram 24 which projects upwardly from the upper stationary platen 6. Ram 24 is of relatively short axial length but is sufficient to maintain the sleeve in vertical axial alignment with the machine, and therefore the engaging surfaces of the sleeve and ram 24 need to be only machine finished, although if desired the surfaces of the stationary ram and lower end of the sleeve may be ground. An upper axially movable but non-rotatable ram 25 is received in the cylinder sleeve through the upper open end thereof and has a ball and socket connection 26 in abutment with the crosshead 9, this ram being opposed to ram 24. Sleeve 23 in effect provides a wall telescopically arranged with the rams to provide an axially expansible fluid chamber 28' therebetween. The ram 25 and sleeve 23 have, preferably, a lapped fit as it is between these elements that elimination of friction must take place.

A series of vertical pins 27 preferably two in number and diametrically opposed are loosely received in suitable recesses formed in crosshead 9 thereby to prevent rotation of ram 25 but still allow free movement of the ball and socket joint 26 which insures proper axial alignment with the sleeve and lower ram 24. If desired the ram may be held against rotation by a flat spring 27' removably secured to crosshead 9 and ram 25 as shown in Fig. 7.

A suitable oil receiving groove 28 is formed adjacent the lower radial edge of sleeve 23 thereby to accumulate any hydraulic liquid that preferably will leak past the cylindrical surfaces of rams 24 and 25 and sleeve 23. Fluid pressure from any source of hydraulic pressure such as a pump or the like may be supplied through a suitable inlet 29 and passages 30 to an expansible pressure chamber 28' formed between the rams by sleeve 23. Any usual relief valves or supply and discharge valves may be associated with pipe 29 and also any suitable pressure gauge for indicating the hydraulic load may be connected to the passages 29 or 30.

To insure maximum effectiveness of the machine it is desirable that leakage of oil occur between the movable ram and sleeve thereby to provide a continuous oil film at these vital surfaces. This leakage may be accumulated in a small annular groove or recess 23' from which the oil drains through a pipe 23" to lubricate if desired the worm gear after which the oil drains to groove 28. Pipe 23" rotates with the sleeve.

From the disclosure so far it is seen that any pressure fluid, for example as oil, supplied within the sleeve between the two rams will exert a hydraulic axial force on the two rams although sleeve 23 will be subjected only to radial pressure forces thereby causing the sleeve to be in substantially self-contained axial equilibrium so far as hydraulic pressure forces are concerned. Total absence of axial fluid forces on the cylinder is effected by having said cylinder in the form of a sleeve which merely cooperates with the rams to provide a wall for the expansible pressure fluid space 28' between the rams. To eliminate friction between the ram 25 and sleeve 23 during relative axial movement therebetween, I have provided a worm gear 31 secured to the outside of the cylinder and preferably adjacent the stationary ram 24. This worm gear is driven, preferably, by a motor actuated worm 32 whose shaft 33 is suitably journalled in a bearing 34 mounted on platen 6 while an electric motor 35 is disclosed preferably as the mode of power to insure not only ease of operation but also a constant rate of rotation. The reaction of the worm or gear drive is received by the stationary ram and does not affect the moving ram and does not increase friction.

Hence it is seen that relative rotation between the ram 25 and sleeve 23 will eliminate the friction of rest between these elements, thereby permitting substantially frictionless axial movement of ram 25 within sleeve 23. This relation is easily maintained during any increasing application of load on the ram by reason of the fact that the cylinder sleeve 23 is not subjected to any axial load producing forces, thus avoiding any tendency for the sleeve to be tilted or forced out of alignment by the load and thereby eliminating the introduction of friction or other error producing conditions in the load producing mechanism 8. The weight of sleeve 23 or any equivalent element is sufficient to hold the sleeve in its lowermost position at all times. Any axial friction between the sleeve and ram is so minute, if it exists at all, as not to require any appreciable force to hold the rotating sleeve in its lower position.

Figure 1:
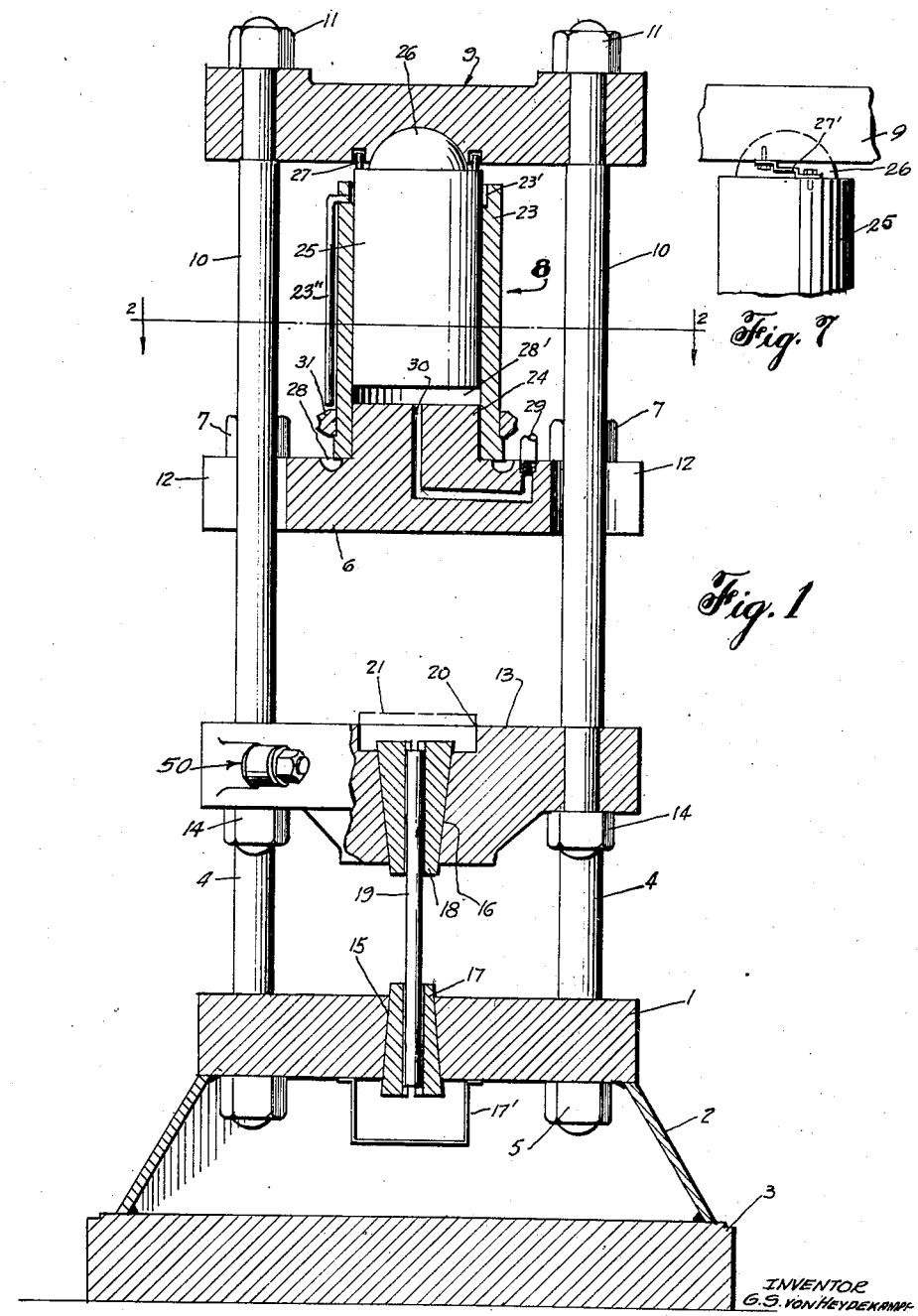
Fig. 1 is a vertical section taken on the line 1—1 of Fig. 2, parts of which are shown in elevation and other parts in section for purposes of clearness.
Figure 5:
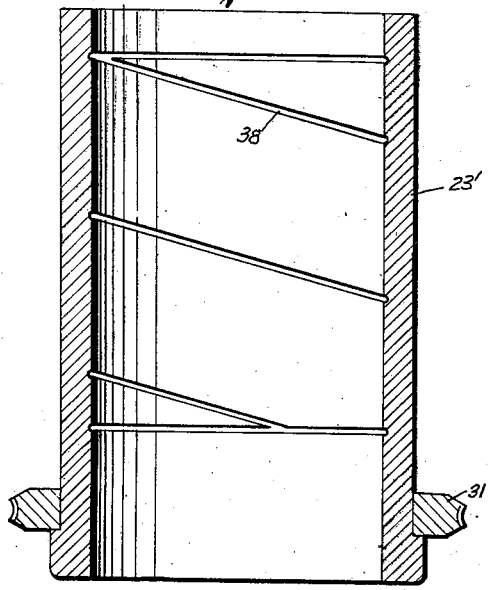
Fig. 5 is a modified form of cylinder sleeve.

The ram 25 and sleeve 23 have preferably lapped surfaces without oil grooves or the like while ram 24 may have a plain machined or lapped surface also without oil grooves. However, in the modification shown in Fig. 4 a movable ram 36 is provided with a spiral oil groove 37 terminating either in an annular groove 38 at the top of the ram or in a suitable overflow recess such as 23' in Fig. 1. Rotation of the cylinder sleeve may be either clockwise or counterclockwise but is preferably in such a direction as to cause hydraulic fluid between the rams to be carried upwardly throughout the length of the groove. Instead of having the grooves in the ram, liquid grooves 38, Fig. 5, may be provided in a modified form of cylinder sleeve 23', it being noted that the lower end of the cylinder bore has merely a plain surface for cooperation with the stationary ram 24.

In the modification of Fig. 6, there is provided what might be termed a hollow stationary ram 40 and an upper movable hollow ram 41, respectively carried by or operatively associated with stationary platen 6 and crosshead 9 in the same manner as in the preferred form, the platen 6 and crosshead 9 being secured to compression-tension rods such as 4 and 10. A rotatable sleeve or chamber wall 42 is journalled within the bores of rams 40 and 41 to form an expansible fluid chamber therebetween, the effective areas of the rams being defined by the inner diameters thereof. The sleeve will have self-contained forces as in the preferred form and this would be true even though a solid member was used in place of sleeve 42 for telescoping with rams 40 and 41, provided of course that free liquid communication is maintained between chambers formed with the rams at the two ends of such a member to equalize the pressure forces on opposite ends thereof, thereby obtaining the advantages of the principles of my invention. The sleeve 42 in effect represents such a solid member, in that the bore therethrough is merely a passage allowing communication between the opposite ends. In all of the forms herein disclosed it will be noted that the self-contained equilibrium of the connecting wall or sleeve is effected by having the opposed ends thereof similarly exposed, either to the same pressure forces as in Fig. 6 or to avoid the same as in Fig. 1.

Another feature of my invention comprises improved adjustable guides generally indicated at 50 carried by movable platen 13 for engaging each of the columns or rods 4. These guides include a ball bearing 51 journalled on an eccentric pin 52 whose shank is rotatably supported in platen 13 and held by set screws 53. By loosening these screws and rotating pin 52, the ball bearing as a unit including its inner and outer races will be moved toward or away from the rods, thereby effecting a desired adjustment.

*Operation.*—A specimen 19 may be placed between platens 1 and 13 and suitably clamped in their respective jaws 17 and 18 whereby upon supplying fluid pressure to sleeve 23 as through supply pipe 29 and passages 30, ram 25 is moved upwardly together with crosshead 9 and rods 10, thereby pulling upwardly on movable platen 13 to subject the specimen to tension. The reaction of this hydraulic load is taken by the upper platen 6 and thence down through the four columns or rods 4. At the same time, motor 35 or any suitable hand operated means, if desired, is caused to rotate worm 32 and worm gear 31, thereby rotating sleeve 23 and eliminating friction of rest between ram 25 and sleeve 23. Due to no axial test or hydraulic load being carried by sleeve 23 which may therefore be termed as an axially floating member, these various elements may be easily maintained in proper alignment with minimum distortion, binding or other error producing conditions, thus allowing the desired nicety of functioning of the friction reducing means together with a resultant high degree of accuracy of the machine.

To test a specimen in compression it is only necessary to remove the jaws 18 and insert a compression block 21 in recess 20 of platen 13 whereupon a specimen is placed between block 21 and the upper platen 6. Application of hydraulic pressure to and beneath ram 25 will again cause upward movement thereof together with crosshead 9 and the pair of rods 10 thus to move platen 13 upwardly to compress the specimen. During either tension or compression tests the hydraulic pressure reading may be taken from the pressure line 29 with full assurance that the pressure reading is a highly accurate indication of the load actually applied to the specimen.

From the foregoing it is seen that I have provided an improved means for weighing mechanical forces, particularly in a hydraulic testing machine of the ram type thereby obtaining the highly desirable feature of its low cost of manufacture while at the same time maintaining a high degree of accuracy such as is paramount in most applications of materials testing machines. It is also seen that the principle involved for accomplishing these results is relatively simple but very effective in producing a machine adapted to give accurate results as the test load in whole or part is not transmitted through a thrust bearing such as has heretofore been attempted. In these prior circumstances, the thrust of the rotating drive against the ram and the hydraulic pressure on the sleeve itself both had to be absorbed with consequent inaccuracies and difficulties, whereas in my improved invention I provide a simple manner of rotating high load members without transmitting the load itself through such a member.

It will of course be understood by those skilled in the art that various changes may be made in the details of construction and arrangement of parts without departing from the spirit of the invention as set forth in the appended claims.

I claim:

1. A hydraulic materials testing machine comprising, in combination, means for supporting a specimen to be tested including stationary and movable frames, hydraulic load producing means including opposed stationary and movable rams, the stationary ram being secured to said stationary frame and the movable ram having provision for being swivelly but non-rotatably connected to the movable frame, and means associated with said rams to form a telescopic wall therebetween, said rams having substantially equal opposed fluid pressure areas similarly related to said wall whereby fluid pressure axially applied between said rams effects axial movement of one of the same without axial movement of the wall.

2. A hydraulic materials testing machine comprising, in combination, means for supporting a specimen to be tested, hydraulic load producing means including opposed rams, means associated therewith to form a telescopic wall therebetween, said rams having substantially equal opposed areas similarly related to said wall whereby fluid pressure axially applied to said rams effects axial movement relatively therebetween, means for rotating said wall while fluid pressure is supplied between said rams, an abutment for one of said rams, and a non-rotatable spherical ball and socket connection between said ram and abutment.

3. A hydraulic materials testing machine comprising upper and lower stationary platens, means for supporting the same in axially spaced relation, a movable platen disposed intermediately of said stationary platens, a crosshead disposed above said upper stationary platen and rigidly connected to said movable intermediate platen for movement therewith, hydraulic load producing means disposed between said crosshead and said upper stationary platen including upper and lower opposed ram members, the upper ram being operatively connected to said crosshead and the lower ram being secured to said upper stationary platen, an outer rotatable sleeve providing a telescopic wall between and surrounding said rams, the opposite ends of said rams having substantially equal opposed areas similarly related to said sleeve, and a motor supported by said upper stationary platen and having a gear connection with said sleeve for rotating the same, said gear connection being disposed adjacent said lower ram so that the latter directly receives the driving thrust without any tilting of said sleeve.

4. A hydraulic materials testing machine comprising, in combination, means for supporting a specimen to be tested, hydraulic load producing means including opposed rams, a wall having telescopic relation with said rams and arranged with respect thereto whereby fluid pressure axially applied between said rams is adapted to effect axial movement of one of said rams without imposing axially unbalanced fluid pressure forces on said wall, and means whereby one of said rams and specimen supporting means are maintained in swivel but non-rotatable relation.

GERD S. von HEYDEKAMPF.